(12) United States Patent
Okumura

(10) Patent No.: US 6,359,432 B1
(45) Date of Patent: Mar. 19, 2002

(54) CONNECTOR AND TURNING ANGLE SENSOR USING SAME

(75) Inventor: Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/250,206

(22) Filed: Feb. 16, 1999

(30) Foreign Application Priority Data

Feb. 26, 1998 (JP) .............................. 10-044903

(51) Int. Cl.⁷ ................................. G01B 7/30
(52) U.S. Cl. ............................ 324/207.2; 324/207.25; 439/15
(58) Field of Search .................... 324/207.22, 207.2, 324/207.21, 207.25; 439/164, 15, 9, 144, 319, 328, 345, 439, 448, 513, 557, 617, 743, 13

(56) References Cited

FOREIGN PATENT DOCUMENTS

| DE | 40 28 931 A1 | 3/1992 |
| DE | 195 06 938 A1 | 8/1996 |
| JP | 1-39555 | 8/1989 |

*Primary Examiner*—Jay Patidar
(74) *Attorney, Agent, or Firm*—Brinks Hofer Gilson & Lione (57) ABSTRACT

The present invention relates to a connector and a turning angle sensor using the same, which is comprised of a ring-like base, a plurality of springs extended from the base and having a bent portion, and a hole provided in the top of the bent portion.

12 Claims, 6 Drawing Sheets

CONNECTOR AND TURNING ANGLE SENSOR USING SAME

BACKGROUND OF THE INVENTION

1. Field of the Invention

The present invention relates to a connector suitable for use in an electrically-operated power steering system of an automobile, and a turning angle sensor using the connector.

2. Description of the Related Art

Figure 12:
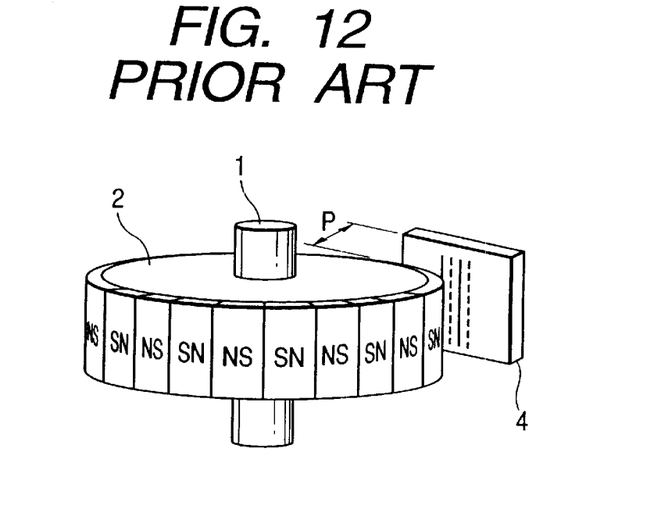
FIG. 12 is a schematic view of a conventional turning angle sensor.

In a conventional turning angle sensor, a rotating drum 2 consisting of a disk-like magnetic body is fixedly mounted on a rotating shaft 1 as shown in FIG. 12. The rotating drum 2 is provided with magnetic codes formed of a plurality of magnetic poles (N-S) all around the perimeter.

On the perimeter of the rotating drum 2, magnetic sensors 4 are arranged at specific intervals P, thereby forming the conventional turning angle sensor.

The conventional turning angle sensor is of such a design that when the rotating shaft 1 is turned to turn the rotating drum 2, the magnetic sensor 4 detects analog changes in the magnetic force of the plurality of magnetic poles, thus enabling the detection of the turning angle of the rotating drum 2.

Figure 13:
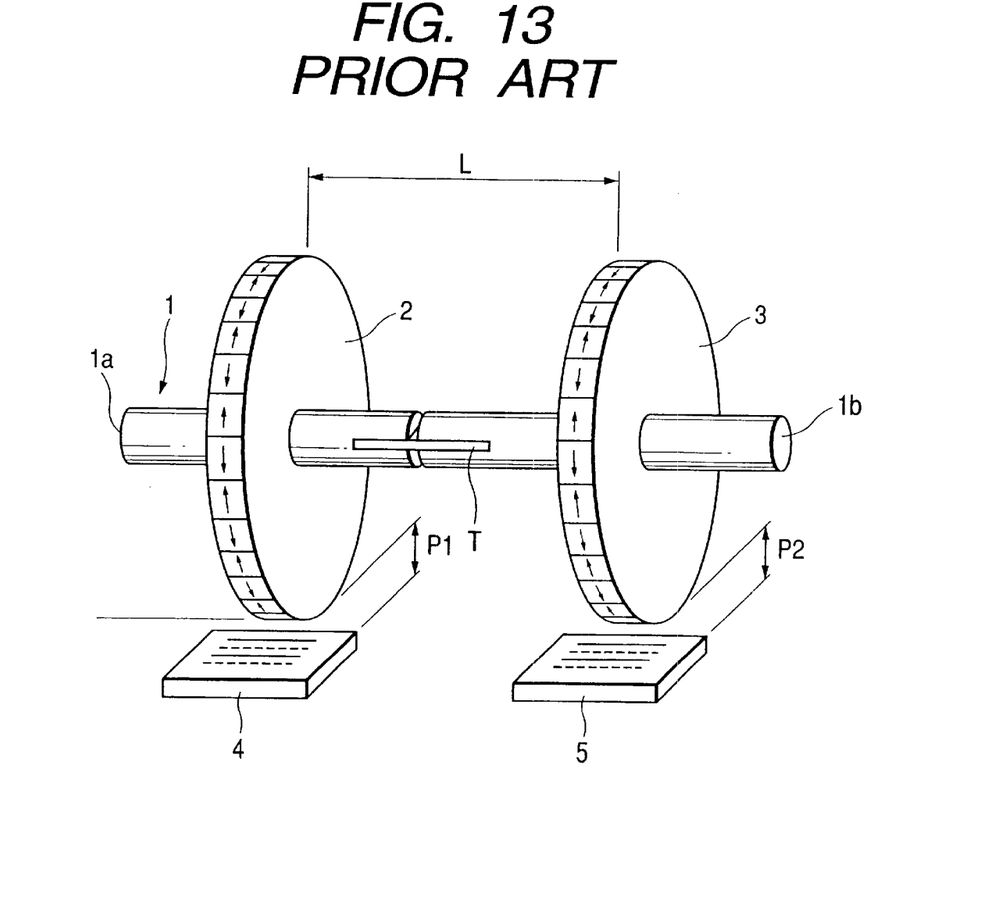
FIG. 13 is an explanatory view of the conventional turning angle sensor.

The conventional turning angle sensor stated above is used for instance in an electrically-operated power steering system of an automobile, which will be explained below. As shown in FIG. 13, the rotating shaft 1 is comprised of a driving shaft 1a and a load shaft 1b, which are coupled with a torsion bar T, so that when the driving shaft 1a is turned, the load shaft 1b is also turned through the torsion bar T.

On the driving shaft 1a and the load shaft 1b thus coupled, two rotating drums 2 and 3 are fixedly mounted near their ends at a spacing L.

On the perimeter of the rotating drums 2 and 3, a pair of magnetic sensors 4 and 5 are arranged at specific intervals P1 and P2, thereby forming the conventional turning angle sensor.

The rotating shaft 1 thus mounted with the conventional turning angle sensor can turn the load shaft 1b from the driving shaft 1a through the torsion bar T by applying a greater torque than the load torque being exerted to the load shaft 1b side to the driving shaft 1a which is formed integrally with a steering wheel.

With the turning of the rotating shaft 1, the load shaft 1b side is turned with a slight delay in relation to the driving shaft 1a side by the torsion bar T.

Because of the delay of rotation of the load shaft 1b side there takes place a difference in the angle of rotation between the driving shaft 1a side and the load shaft 1b side. The difference in the angle of rotation is proportional to a difference between the load torque and the rotational torque of the driving shaft 1a, that is, to a torque between these two shafts. The difference in the rotational angle increases with an increase in the torque between the two shafts, and reversely decreases with a decrease in the torque between the two shafts.

According to the conventional turning angle sensor, the turning angle is detected on either side of the driving shaft 1a and the load shaft 1b respectively to determine a difference in the turning angle, and then a torque between the load shaft 1b and the driving shaft 1a is measured to determine an assist power to be added to the load shaft 1b.

In the conventional turning angle sensor, however, the rotating drums 2 and 3 are directly fixedly mounted on the driving shaft 1a and the load shaft 1b, presenting such problems as troublesome rotating drum mounting operation and low producibility.

To solve the problems, a spring member not shown is interposed between the driving shaft 1a and the rotating drum 2 and between the load shaft 1b and the rotating drum 3, thereby facilitating assembling of the rotating drums 2 and 3 to the driving shaft 1a and the load shaft 1b. In this case, however, the transmission of rotation from the driving shaft 1a and the load shaft 1b to the rotating drums 2 and 3 by means of the spring member is not effectively done, resulting in improper transmission of rotation from the driving shaft 1a and the load shaft 1b to the rotating drums 2 and 3.

The present invention provides, as a first means to solve the above-described problem, the connector including a metal plate for frictional engagement between the rotating shaft and the rotating body in the center part of which the rotating shaft is inserted, to turn the rotating body together with the rotating shaft. The connector has a ring-like base, a plurality of springs extended from the base and having a bent portion, and a hole in the top of the bent portion.

As a second means to solve the above-described problem, the connector has a rectangular hole in the top of the bent portion.

As a third means to solve the above-described problem, there is provided the connector having the spring formed by bending the base approximately squarely; the bent portion with the hole being formed wider than the root of the bent portion of the spring.

As a fourth means to solve the above-described problem, the connector has a condition such that the hole formed is located at the center in the direction of width of the bent portion.

Furthermore, as a fifth means to solve the above-described problem, the turning angle sensor comprises a connecting portion which includes the rotating body for driving the magnets, the rotating shaft inserted at the center of the rotating body, and the metal plate attached on the rotating body to turn the rotating body together with the rotation of the rotating shaft with the rotating body held in frictional engagement with the rotating shaft. The connecting portion has the ring-like base, a plurality of springs extended from the base and having the bent portion, and a hole provided in the top of the bent portion; the base being attached to the rotating body to hold the peripheral edge of the hole in frictional engagement with the rotating shaft by the force of the spring.

Furthermore, as a sixth means to solve the above-described problem of the turning angle sensor the hole provided in the top of the bent portion is formed rectangular, and the peripheral edge of the rectangular hole is held in frictional engagement with the rotating shaft.

Furthermore, as a seventh means to solve the above-described problem the spring of the turning angle sensor is formed by bending approximately squarely at the base; and the bent portion having the hole is made wider than the bent base of the spring.

Furthermore, as an eighth means to solve the above-described problem the hole of the turning angle sensor is formed at the center of the width of the bent portion.

DESCRIPTION OF THE PREFERRED EMBODIMENTS

A connector and a turning angle sensor of the present invention using the connector will be described with reference to FIG. 1 to FIG. 11.

Figure 3A:
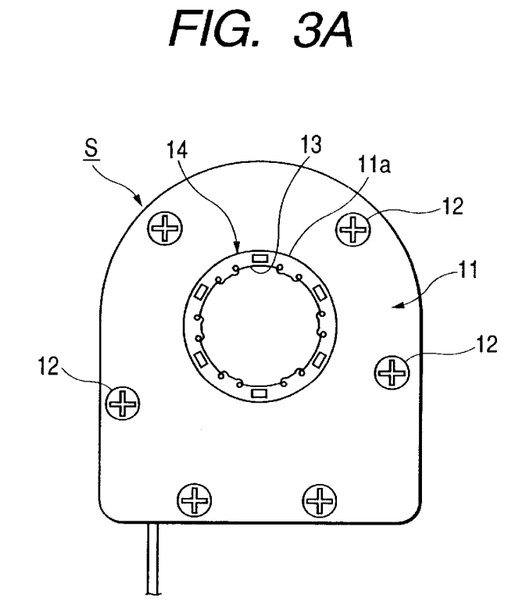
FIG. 3 is a outside appearance of the turning angle sensor according to the present invention.
Figure 3B:
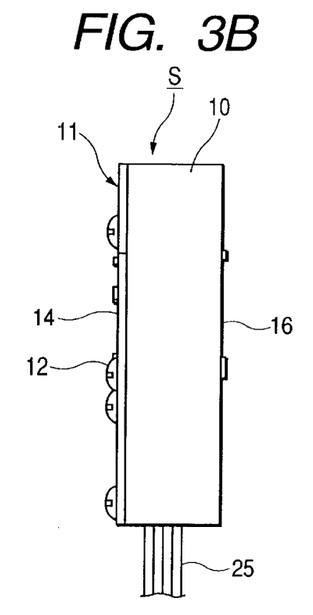

First, in the turning angle sensor of the present invention, as shown in the outside drawings FIGS. 3A and 3B, there is provided a casing 10 molded hollow inside and approximately D-shaped outside.

A cover 11 is attached to cover the casing 10 from above. This cover 11 is plate-like and formed to the same contour as the casing 10, and is secured by a plurality of screws 12 to the casing 10, thereby closing the upper part of the casing 10.

Figure 2:
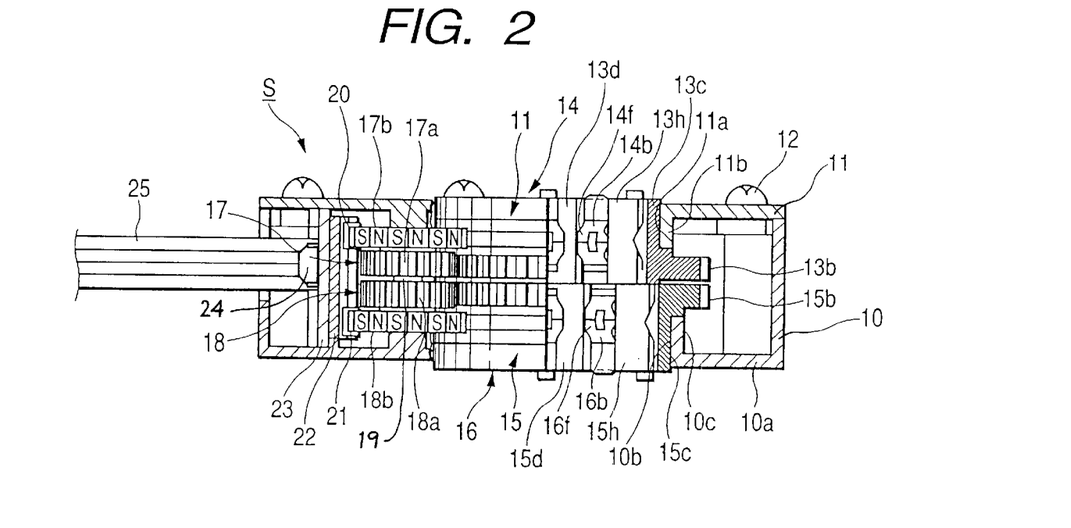
FIG. 2 is a side view in section of a major portion of the turning angle sensor according to the present invention.

Near the center of a bottom wall 10a of the bottom of the casing 10, a round opening 10b is formed as shown in FIG. 2. Around the opening 10b a round guide wall 10c is formed protruding upward to a specific level in the drawing.

Also near the center of the cover 11 a round opening 11a is formed similarly to the casing 10. Around the opening 11a a guide wall 11b is formed protruding downward to a specific level as shown in FIG. 2.

A first rotating body 13 inserted in the opening 11a of the cover 11 is formed of a molding material. As shown in a side view in section of a major portion of FIG. 5, the first rotating body 13 has a collar 13a in the lower part of the drawing; on the outer periphery of the collar 13a, there is formed a gear 13b having a specific number of teeth and module as shown in the top view FIG. 4.

Figure 5:
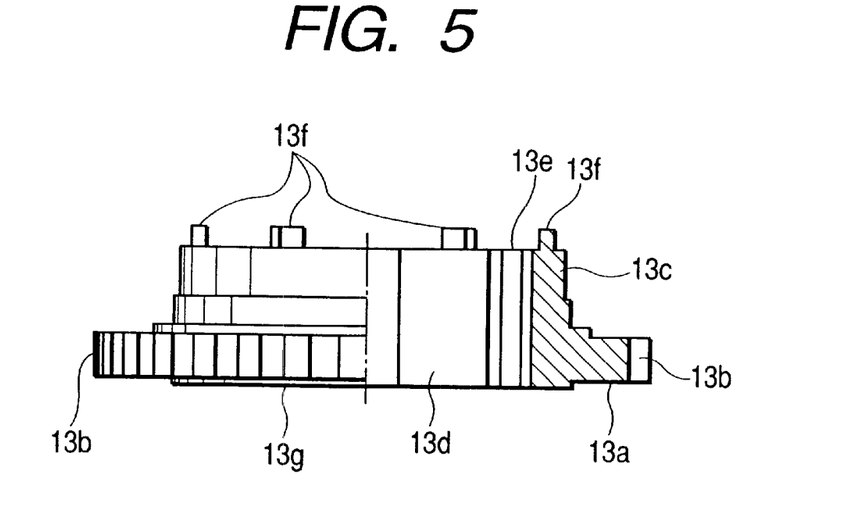
FIG. 5 is a side view in section of a major portion of the first rotating body of the turning angle sensor according to the present invention.

The first rotating body 13 is provided with a bearing 13c of a specific height on the collar 13a and is formed approximately in the shape of the collar.

Figure 4:
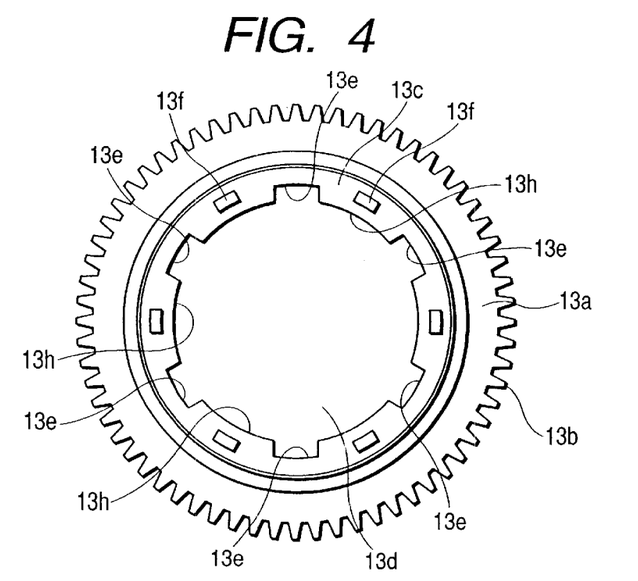
FIG. 4 is a plan view of a first rotating body of the turning angle sensor according to the present invention.

The first rotating body 13 has a round shaft bore 13d formed through at the center of rotation as shown in FIG. 4. On the inner peripheral surface 13h of the shaft bore 13d, a plurality of grooves 13e of specific depth and width are formed in the axial direction. Also on the upper surface of the bearing 13c, a plurality of rectangular projections 13f are formed protruding to a specific level.

Around the shaft bore 13d on the lower surface side of the collar 13a shown in FIG. 5, a ring-like projection 13g is formed protruding to a slight level.

The bearing 13c of the first rotating body 13 is inserted in the opening 11a of the cover 11 and rotatably guided on the ambient guide wall 11b.

Figure 6:
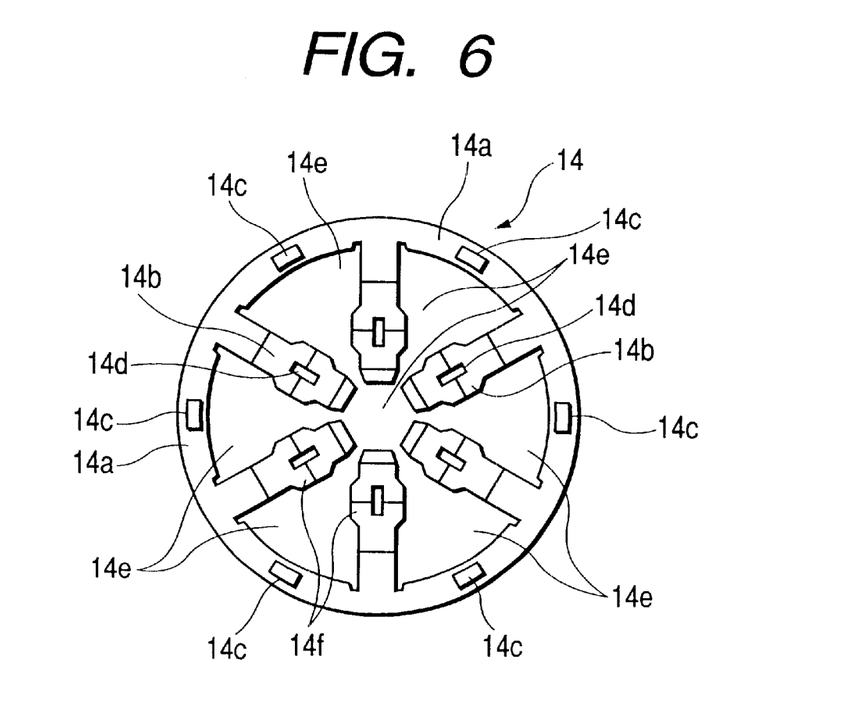
FIG. 6 is a developed plan view of the connector according to the present invention.
Figure 7:
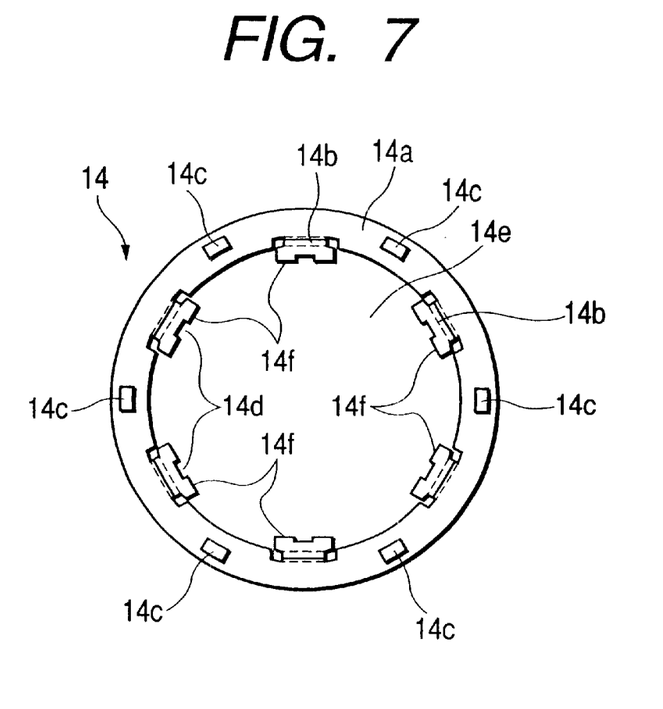
FIG. 7 is a plan view of the spring after bending of the connector according to the present invention
Figure 8:
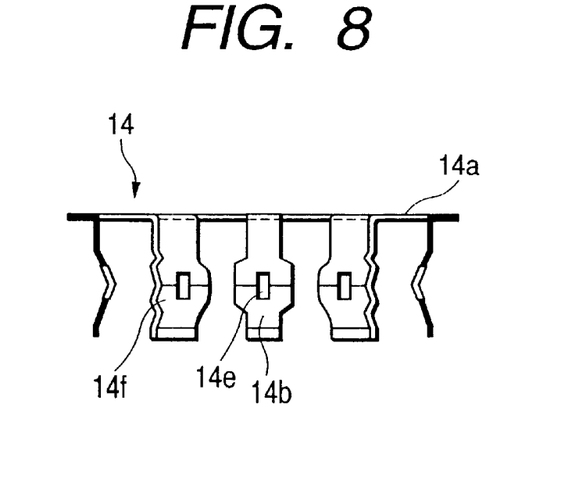
FIG. 8 is a side view of the spring after bending of the connector according to the present invention.

On the upper surface of the bearing 13c of the first rotating body 13, a first connector 14 produced of a metal plate and formed as a ring-like spring member in the outside shape is installed as shown in FIGS. 6, 7 and 8. The first connector 14, produced of a resilient stainless plate, is formed by punching on a press, and has an ring-like base 14a on the outer peripheral portion and a plurality of springs 14b extended from the base 14a towards the inside opening 14e as shown in FIG. 6.

In the base 14a a plurality of square holes 14c are formed by punching. Near the forward end of the spring 14b a rectangular hole 14d is also formed by punching. The spring 14b has an approximately mountain-shaped bent portion 14f with the rectangular hole 14d formed in the top portion.

In the first connector 14 the root portion of the spring 14b is bent down approximately squarely inside of the ring-like base 14a as shown in the side view in section of FIG. 8, and the opening 14e is formed approximately round as shown in the top view of FIG. 7.

The width of the bent base of the spring 14b is increased more than the width of the bent portion 14f having the rectangular hole 14d, so that the spring portion 14b will be formed approximately uniform in sectional area, and also the hole 14d will be formed at the center of width of the bent portion 14f.

In the aforesaid first connector 14, as shown in FIG. 2, a plurality of projections 13f formed on the upper surface of the bearing 13c of the first rotating body 13 are inserted into a plurality of square holes 14c of the base 14a. The forward end of the projection 13f protruding upward out from the square hole is staked by heat-staking to thereby form the first rotating body 13 and the first connector 14 into one body.

The spring 14b bent downward is located in the groove 13e of the first rotating body 13, and the top of the mountain-shaped portion of the spring 14b where the rectangular hole 14d portion is formed protrudes into the shaft bore 13d from the inner peripheral surface 13h of the shaft bore 13d of the first rotating body 13.

In the lower part depicted in FIG. 2 which is located oppositely to the first rotating body 13, a second rotating body 15 of approximately the same configuration as the first rotating body 13 is provided with a gear 15b, a bearing 15c, and a shaft bore 15d having an inner peripheral surface 15h.

A second connector 16 which is approximately of the same shape as the first connector 14 and has a spring 16b is attached on the second rotating body 15 by the same method as the first connector 14.

That is, the first and second connectors 14 and 16 comprising plate spring members are attached to the inner peripheral surfaces 13h and 15h of the shaft bores 13d and 15d of the first rotating body 13 and the second rotating body 15 respectively.

The bearing 15c of the second rotating body 15 is inserted in the opening 10b of the casing 10, and is rotatably guided on the ambient guide wall 10c.

Either of the first rotating body 13 and the second rotating body 15 mounted in the casing 10 and covered with the cover 11 has one center of rotation, so that they can rotate separately.

Figure 1:
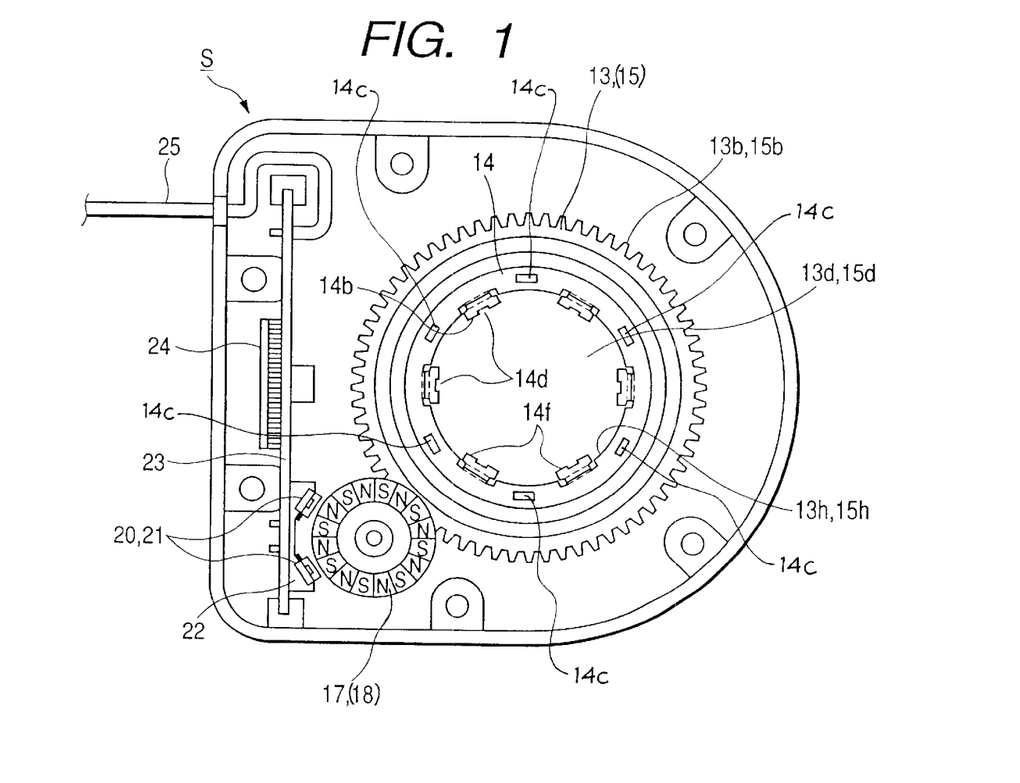
FIG. 1 is a plan view of a turning angle sensor without a cover used in a connector of the present invention.

In the lower left part in the casing 10 in FIG. 1 there are arranged a first code disk 17 which is in mesh with the gear 13b of the first rotating body 13 and a second code disk 18 which is in mesh with the gear 15b of the second rotating body 15.

Figure 9A:
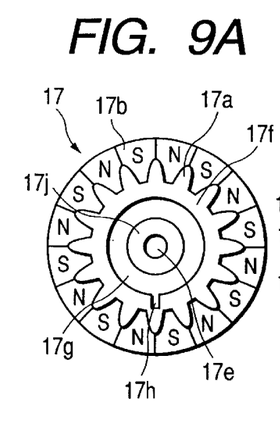
FIG. 9 is an explanatory view of a code disk of the turning angle sensor according to the present invention.
Figure 9B:
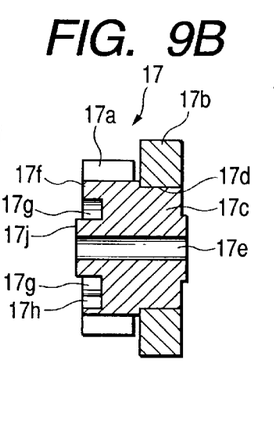
Figure 9C:
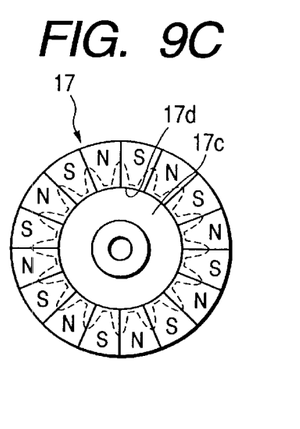

The first code disk 17, as shown in FIG. 9, is comprised of a gear 17a produced of a resin material or other which meshes with the gear 13b of the first rotating body 13, and an information recording section 17b including a magnetic body having a plurality of magnetic poles (N-S) and attached on the other side of the gear 17a.

The information recording section 17b is formed like a disk which is larger in outside diameter than the gear 17a. On the other side of the gear 17a a boss 17c is protuberantly formed.

The boss 17c of the gear 17a is pressed or bonded into the boss bore 17d of the information recording section 17b to thereby form the gear 17a and the information recording section 17b as one body.

At the center of rotation of the first code disk 17 a shaft bore 17e is formed through. In one side surface 17f of the gear 17a are formed a spring groove 17g of a specific depth and a spring retaining slit 17h for locking an unillustrated torsion coil spring inserted in the spring groove 17g.

On one side surface 17f and the inner peripheral side of the spring groove 17g there is formed a projection 17j protruding a little from the side surface 17f.

The second code disk 18 of the same shape as the first code disk 17 is disposed under, and oppositely to, the gear 17a of the first code disk 17 as shown in FIG. 2.

On the second code disk 18 are formed a gear 18a which is in mesh with the gear 15b of the second rotating body 15, an information recording section 18b, a shaft bore not shown, and a projection not shown. A metal support shaft 19 is inserted in the shaft bore 17e of the first code disk and the shaft bore not shown of the second code disk 18 in such a manner that the opposite sides of the gear 17a and the gear 18a mutually contact, so that the code disks 17 and 18 can rotate respectively.

The support shaft 19 is secured at the upper end portion on the cover 11 side and at the lower end portion on the casing 10 side, and the first code disk 17 and the second code disk 18 are housed inside of the casing 10.

In the spring groove 17g a torsion coil spring not shown is inserted to prevent occurrence of a backlash in the two code disks 17 and 18.

In the left lower corner of the casing 10 shown in FIG. 1 there is disposed a holder 22 fitted with a first detecting element 20 and a second detecting element 21 composed of Hall elements, etc. for detecting information written in the information recording sections 17b and 18b of the code disks 17 and 18, that is, magnetic information.

The holders 22 have mounting surfaces arranged along the code disks 17 and 18, for mounting the detecting elements 20 and 21. The first detecting element 20 and the second detecting element 21 are separately mounted in upper and lower stages, facing these two mounting surfaces. The first detecting elements 20, 20 are mounted in positions corresponding to the information recording section 17b of the first code disk 17, and similarly the second detecting elements 21, 21 are mounted in positions corresponding to the information recording section 18b of the second code disk 18.

The holder 22 mounted with the first and second detecting elements 20 and 21 has a flat back, which is bonded with an adhesive to a rear base plate 23.

The insulating base plate 23 is fitted with an IC 24 for processing information supplied from the detecting elements 20 and 21; and a lead wire 25 is soldered to the base plate 23 for transmitting the information thus processed at the IC 24 out.

Next, the turning angle sensor S of the present invention applied as a torque sensor to a steering shaft of an automobile will be described.

Figure 10:
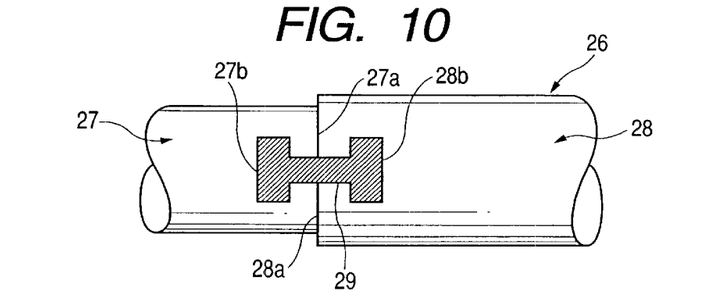
FIG. 10 is a side view of a major portion of a steering shaft mounted with the turning angle sensor of the present invention.

First, in a steering shaft 26 of an automobile, as shown in FIG. 10, for instance a first rotating shaft 27 and a second rotating shaft 28 have T-slots 27b and 28b in their ends 27a and 28a; the ends 27a and 28a are butt-jointed with an elastic member 29 depicted in black such as a torsion bar inserted in the slots 27b and 28b, thus connecting the first rotating shaft 27 and the second rotating shaft 28.

The first rotating body 13 of the turning angle sensor S of the present invention is inserted into the end 27a of the first rotating shaft 27, and also the second rotating body 15 of the turning angle sensor S is inserted into the end 28a of the second rotating shaft 28.

Then, the turning angle sensor S is mounted to the steering shaft 26 as follows: the springs 14b and 16b of the first and second connectors 14 and 16, which are spring members arranged on the inner peripheral surfaces 13h and 15h of the shaft bores 13d and 15d of the first rotating body 13 and the second rotating body 15, elastically press the first rotating shaft 27 and the second rotating shaft 28 until the first rotating body 13 and the second rotating body 15 make frictional engagement with the first rotating shaft 27 and the second rotating shaft 28 through the first and second connectors 14 and 16.

That is, the peripheral edge of the rectangular hole 14d provided in the top of the bent portion 14f of the first connector 14 is being pressed by the spring 14b in frictional engagement with the first rotating shaft 27, and similarly the connector 16 also is in frictional engagement with the second rotating shaft 28.

Figure 11:
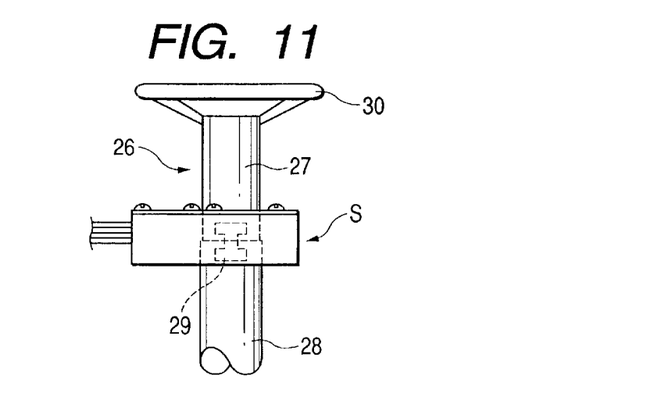
FIG. 11 is a schematic view of the turning angle sensor of the present invention mounted on the steering shaft.

Furthermore, in the steering shaft 26, as shown in FIG. 11, a steering wheel 30 is mounted on the first rotating shaft 27 side, while the second rotating shaft 28 side is connected to an unillustrated wheel side, so that when the steering wheel 30 is turned to turn the second rotating shaft 28, the torque of the second rotating shaft 28 increases depending upon the condition of an unillustrated road surface which the wheel contacts. At this time, when the steering wheel 30 is manipulated to turn the first rotating shaft 27, the second rotating shaft 28 is also turned by an elastic member 29 with a delay after the first rotating shaft 27, producing a difference in the turning angle between the first rotating shaft 27 and the second rotating shaft 28.

With the occurrence of the difference in the turning angle, the number of revolutions varies between the first code disk 17 and the second code disk 18; the variation in the number of revolutions is detected by the first detecting element 20 and the second detecting element 21. The difference in the number of revolutions between the code disks 17 and 18 thus detected is computed at the IC 24, to thereby detect the torque on the first rotating shaft 27 side. Therefore the turning angle sensor S of the present invention is usable as a torque sensor.

The electrically-operated power steering system of the present invention is equipped with an unillustrated electric motor which helps the operation of the steering wheel 30. When the steering wheel 30 is turned, the torque sensor detects the torque of the first rotating shaft 27. When the torque of the first rotating shaft 27 exceeds a predetermined value, an operation order is supplied from the IC 24 to the motor side through a driver, thereby operating the motor.

Thus the motor turns to assist the driver to manipulate the steering wheel 30, that is, to turn the steering wheel 30 with a reduced torque.

In the turning angle sensor S of the present invention heretofore explained, magnetic media are used as the information recording sections 17b and 18b of the code disks 17 and 18, and magnetic sensors as the detecting elements 20 and 21. It is, however, to be noticed that the information recording sections 17b and 18b may be identification marks identifiable by a photosensor, and the detecting elements may be provided with optical code disks and detecting elements which are comprised of photosensors including a light-emitting device and a light-receiving device.

The connector of the present invention is comprised of a ring-like base 14a, a plurality of springs 14b extended from the base and having a bent portion 14f, and a hole 14d provided in the top of the bent portion 14f. It is, therefore, possible to provide a low-cost connector which is of simple constitution and good producibility.

Since the hole 14d is formed in the top of the bent portion 14f, the peripheral edge of the hole 14d is held in frictional engagement with the rotating shaft, enabling the provision of a connector through which rotation is transmitted properly to the rotating body 13.

Also, as a result of formation of the rectangular hole 14d, it is possible to provide a connector having a long peripheral edge of the rotating shaft 27 in engagement with the hole 14d and accordingly having a large portion of frictional engagement.

Furthermore, it is possible to provide a connector which ensures more reliable frictional engagement of the bent portion 14f with the rotating shaft 27 because of its larger width than the root of the spring 14b and an increased strength provided by bending. Also the provision of uniform sectional area of the spring member 14b eliminates a part of stress concentration and accordingly adds an equal stress, making it possible to provide a connector having excellent characteristics of spring.

Furthermore, the provision of the hole 14d at the center of width of the bent portion 14f stabilizes the peripheral edge of the hole 14d on the rotating shaft 27, thereby enabling to provide a connector which ensures reliable engagement.

Furthermore, in the turning angle sensor of the present invention the connector is comprised of a ring-like base 14a, a plurality of springs 14b extended from the base and having a bent portion 14f, and a hole 14d made in the top of the bent portion 14f. It is, therefore, possible to provide a low-cost connector of simple constitution and good producibility.

Furthermore, the ring-like base 14a of the connector 14 is attached to the rotating body 13; and the hole 14d in the top of the bent portion 14f is in elastic contact with the rotating shaft 27, to keep the peripheral edge of the hole 14d in frictional engagement with the rotating shaft 27; and therefore rotation from the rotating shaft 27 can be reliably transmitted to the rotating body 13 through the connector 14, thus enabling the provision of a turning angle sensor capable of reliable transmission of rotation to the rotating body 13.

Furthermore, the formation of the rectangular hole 14d in the connector 14 provides a longer part of engagement of the peripheral edge of the hole 14d with the rotating shaft 27 and accordingly increases a larger part of frictional engagement of the connector 14 with the rotating shaft 27, making it possible to provide a turning angle sensor which is capable of reliable transmission of rotation to the rotating body 13.

Furthermore, it is possible to provide a connector which ensures more reliable frictional engagement of the bent portion 14f with the rotating shaft 27 because of its larger width than the root of the spring 14b of the connector 14 and an increased strength provided by bending the bent portion 14f. Also the provision of uniform sectional area of the spring member 14b eliminates a part of stress concentration and accordingly adds an equal stress, making it possible to provide a turning angle sensor having excellent characteristics of spring.

Furthermore, because of the formation of the hole 14d of the connector 14 at the center of width of the bent portion 14f a turning angle sensor provided ensures reliable, stabilized engagement of the peripheral edge of the hole 14d with the rotating shaft 27.

What is claimed is:

1. A connector for connecting a rotating shaft and a rotating body, comprising: a connector produced of a resilient metal disk for integrally turning said rotating body with said rotating shaft; said rotating shaft being inserted and fitted to a shaft bore of said rotating body; said connector having a ring-like base, a plurality of spring pieces radially extended from said base toward a center of said base, each having a bent portion bent so as to rise with respect to a surface of said ring-like base and bent at the center thereof in a substantially triangular shape toward the center of said base, and a hole formed in a top of said bent portion and allowing deformation of said bent portion; said rotating body being formed with a plurality of grooves in an inner peripheral surface constituting said shaft bore for receiving and accommodating said plurality of spring pieces by projecting at least said bent portion of each spring piece from the inner peripheral surface by a desired length, wherein said connector is secured to said rotating body with said plurality of spring pieces accommodated in said plurality of grooves of said rotating body, and said rotating shaft is elastically pressed and inserted into said shaft bore while deforming said bent portion of said connector to make frictional engagement between said rotating shaft and said rotating body through said connector provided therebetween.

2. A connector according to claim 1, wherein the hole provided in the top of said bent portion is rectangular.

3. A connector according to claim 1, wherein the width of said bent portion having said hole is made wider than that of said bent root of each of said plurality of spring pieces.

4. A connector according to claim 3, wherein said hole is formed at the center of width of said bent portion.

5. A turning angle sensor, comprising: a rotating body for detecting the torque of a detected body; a rotating shaft inserted and fitted to a shaft bore of said rotating body to be attached to said detected body; and a connecting section produced of a resilient metal plate for integrally turning said rotating body with said rotating shaft; said connecting section having a ring-like base, a plurality of spring pieces radially extended from said base toward a center of said base, each having a bent portion bent so as to rise with respect to a surface of said ring-like base, and bent at the center thereof in a substantially triangular shape toward the center of said base, and a hole made in a top of said bent portion allowing deformation of said bent portion; said rotating body being formed with a plurality of grooves in an inner peripheral surface constituting said shaft bore for receiving and accommodating said plurality of spring pieces by projecting at least said bent portion of each spring piece from the inner peripheral surface by a desired length, wherein said connector is secured to said rotating body with said plurality of spring pieces accommodated in said plurality of grooves of said rotated body, and frictional engagement is made between said rotating shaft and said rotating body through said connector provided therebetween by elastically pressing and inserting said rotating shaft into said shaft bore while deforming said bent portion of said connector.

6. A turning angle sensor according to claim 5, wherein said hole made in the top of said bent portion is formed rectangular, and the peripheral edge of said rectangular hole is held in frictional engagement with said rotating shaft.

7. A turning angle sensor according to claim 5, wherein the width of said bent portion having said hole is made wider than that of said bent root of each of said plurality of spring pieces.

8. A turning angle sensor according to claim 7, wherein said hole is formed at the center of width of said bent portion.

9. A connector for connecting a rotating shaft and a rotating body, comprising: a connector produced of a resilient metal disk for integrally turning said rotating body with said rotating shaft; said rotating shaft being inserted into a round shaft bore of said rotating body; said connector having a ring-like base, a plurality of spring pieces provided between an outer peripheral surface of said rotating shaft and an inner peripheral surface of said rotating body to be extended in an axial direction of said rotating shaft and provided along the outer peripheral surface of said rotating shaft, each having a bent portion bent at a center thereof in a substantially triangular shape so as to project toward said rotating shaft, a hole formed in a top of said bent portion and a ring-like base for connecting an end of said spring piece, wherein said connector is held in said rotating body, and said rotating shaft is elastically pressed and inserted into said shaft bore of said rotating body while deforming said bent portion of said connector to elastically being a peripheral edge of the hole of said bent portion into contact with said rotating shaft, and frictional engagement is made between said rotating shaft and said rotating body through said connector provided therebetween.

10. A connector according to claim 9, wherein said ring-like base is formed of a flat plate, said base is abutted on a flat surface formed around said shaft bore of said rotating body, and each spring piece is formed by bending a plurality of pieces radially extended from said base toward the center of said base so as to rise with respect to a surface of said ring-like base, and is bent in a substantially triangular shape at the center thereof toward the center of said base to form said bent portion.

11. A connector according to claim 10, wherein the base of said rotating body is secured to a flat surface of said rotating body.

12. A connector according to claim 10, wherein said rotating body is formed with a plurality of grooves on the inner peripheral surface constituting said shaft bore for receiving and accommodating said plurality of spring pieces by projecting at least said bent portion of each spring piece from the inner peripheral surface by a desired length.

* * * * *